United States Patent [19]

Iwasaki et al.

[11] Patent Number: 4,884,500
[45] Date of Patent: Dec. 5, 1989

[54] APPARATUS FOR MAINTAINING OR RESTORING FRESHNESS OF VEGETABLE BODY

[76] Inventors: Yoshihiko Iwasaki, 4228, Oazakabayama, Mimata-cho, Kitamorogata-gun, Miyazaki; Toyosaburo Noguchi, 9, Chuo-machi 1-chome, Saito-shi, Miyazaki, both of Japan

[21] Appl. No.: 321,997

[22] Filed: Mar. 13, 1989

Related U.S. Application Data

[62] Division of Ser. No. 24,337, Mar. 10, 1987.

[30] Foreign Application Priority Data

Mar. 15, 1986 [JP] Japan .................................. 61-57695

[51] Int. Cl.⁴ .............................................. A23B 7/00
[52] U.S. Cl. ........................................ 99/517; 99/536; 366/107; 366/173
[58] Field of Search ................. 99/348, 467, 470, 455, 99/485, 516, 517, 534, 536; 366/101, 136, 107, 137, 167, 165, 173; 426/419, 486, 270; 261/77, 76, 121.1, 124

[56] References Cited

U.S. PATENT DOCUMENTS

| | | | |
|---|---|---|---|
| 981,098 | 1/1911 | McCaskell | 366/107 |
| 1,055,353 | 3/1913 | Plummer | 99/517 |
| 1,192,478 | 7/1916 | Vandercook | 366/165 |
| 3,333,967 | 8/1967 | Burg | 426/419 |
| 4,321,863 | 3/1982 | Dimov et al. | 99/517 |
| 4,392,418 | 7/1983 | Jimenez | 99/536 |
| 4,664,926 | 5/1987 | Scrimshire | 426/519 |

*Primary Examiner*—Timothy F. Simone
*Attorney, Agent, or Firm*—Rodman & Rodman

[57] ABSTRACT

Method and apparatus for maintaining or restoring freshness of vegetables wherein at least part of the vegetable body is immersed into low temperature water supersaturated with air dissolved therein by blowing air in water through pores having a size range of from 0.1 to 10 microns in diameter.

6 Claims, 4 Drawing Sheets

FIG. I

Test of the solubility of $O_2$ in the cold water treated by meas of S·P·G

Test of the solubility of $O_2$ in the cold water by direct-blowing of the pressurized

APPARATUS FOR MAINTAINING OR RESTORING FRESHNESS OF VEGETABLE BODY

This is a division of application Ser. No. 024,337, filed Mar. 10, 1987, pending.

BACKGROUND OF THE INVENTION

The present invention relates to a method and an apparatus for maintaining or restoring freshness of vegetable bodies such as plants, vegetables, fruits, flowers, flowering plants and leaves. Furthermore, the present invention relates to a method and an apparatus for planning to maintain or restore freshness of vegetables and fruits.

Methods of preserving freshness of vegetables and fruits have heretofore been practised such as a method, wherein the vegetables and fruits are immersed into or sprayed with cold water or cold brine. Due to the lowered temperature of the vegetables and fruits, living functions thereof are controlled namely, consumption of activated physiological energy is avoided by a reduced respiration value, evaporation is controlled and deteriorated product quality due to withering and the like is prevented other methods. Numerous variations of this technique have been proposed.

Several examples of these proposals are listed here, and differences thereof from the present invention will hereunder be described.

Japanese Patent Laid-Open (Kokai) No. 35165/72 discloses a method wherein the vegetables and fruits are immersed in or sprayed with an aqueous solution containing 0.2-1.0% of sodium acetate, said aqueous solution being added thereto with low concentration brine, Japanese Patent Laid-Open (Kokai) No. 159783/80 discloses a method wherein the vegetables and fruits are vacuum-treated, subsequently, sprayed with cold water, and thereafter, stored under reduced pressure.

Japanese Patent Laid-Open (Kokai) No. 131345/80 discloses a method wherein the vegetables and fruits are immersed in hypochlorous acid solution, rinsed with water, thereafter, immersed in anti-oxidant bactericidal water, and then, dehydrated and stored, Japanese Laid-Open (Kokai) No. 159783/80 discloses a method wherein the vegetables and fruits are put into a vacuum tank, a cold water layer is formed on the surface of the vacuum tank by spraying to generate micromist in the vacuum tank, thereafter, the vacuum tank is drawn vacuum, cooled and stored, and Japanese Patent Laid-Open (Kokai) No. 113227/81 discloses a method wherein the vegetables and fruits are passed through cold water showering, and placed in a refrigerator under low temperature and high humidity, to thereby hold freshness thereof.

All of the above-described proposals require considerably complicated apparatus which can lead to troublesome operations.

The following proposals disclose methods wherein, when stored, the vegetables and fruits are brought into contact with various additives for holding freshness.

Japanese Patent Laid-Open (Kokai) No. 60940/83 discloses a method wherein the vegetables and fruits are brought into contact with zeolite, silicic acid clay and the like, Japanese Patent Laid-Open (Kokai) No. 143576/84 discloses a method wherein the vegetables and fruits are coated or sprayed with a member selected from the group consisting of L-ascorbic acid, ferrous sulfate, ferrous chloride and ferrous nitrate, Japanese Patent Laid-Open (Kokai) No. 24152/85 discloses a method wherein the vegetables and fruits are immersed in or sprayed with an aqueous solution containing 1 weight part of lecithin taken to 10-5,000 weight parts of water, said lecithin being mixed with and dispersed in the water, and Japanese Patent Laid-Open (Kokai) No. 49740/85 discloses a method wherein cold water is added thereto with 1-2 weight % of a member selected from the group consisting of propylene, glycol-glycerine-ethanol and salt as an antifreeze and 2-5 weight % of zeolite as a dehydrating agent.

It cannot be said that there are no problems about the additives themselves, and much consideration may be still required for holding freshness of the food products.

As methods wherein the vegetables and fruits are placed in a sealed vessel containing therein any one of various gases so as to hold the freshness thereof, there are methods as follows.

Japanese Patent Laid-Open (Kokai) No. 153753/85 discloses a method wherein the vegetables and fruits are placed in a gaseous atmosphere of any one of saturated hydrocarbons such as propane and butane or any one of halogenated hydrocarbons such as trichlorofluoromethane and trichlorotrifluoroethane, and Japanese Patent Laid-Open (Kokai) No. 75756/74 discloses a method wherein the vegetables and fruits are stored in a sealed vessel in which gaseous values of nitrogen and oxygen differ from each other in accordance with the types of the vegetables and fruits.

These methods have various problems including the sealed vessel itself, the relationship between the sealed vessel and the gas generator, and the like.

In the case where cold water is used or brine is added to cold water in the above-described prior art, due to absorption of moisture and the like to some extent, evaporation of moisture from the vegetables and fruits can be controlled. However, remarkably improved freshness cannot be obtained. Furthermore, as for the cold brine, regulation of brine concentration (within several percent order) is needed in accordance with the types of the vegetables and fruits and the usage of salt amounts to a high value, so that this method cannot be recognized to be an easy and economical method.

As described above, according to the prior art, the apparatus and vessels require high costs and problems are involved in blending of additives and the relationship between the additives and food products, and further operating procedures are complicated as well.

In view of the above-described problems, the present invention has been achieved as the results of various studies to develop a method and an apparatus which affords greater economy by using a simple apparatus that is easy to operate.

SUMMARY OF THE INVENTION

More specifically, the present invention contemplates in a method of maintaining or restoring freshness of a vegetable body, wherein at least part of the vegetable body is immersed in cold, low temperature water having supersaturated with dissolved air. Furthermore, the present invention contemplates an apparatus for maintaining or restoring freshness of a vegetable body, having a tank for immersing the vegetable body, wherein the tank for immersing the vegetable body comprises: a pressurized air chamber having an opening to be connected to a pressurized air supply source; and a chamber for immersing the vegetable body, communicable with said pressurized air chamber through pores of a porous separator wall member.

According to the present invention, the terms vegetable or vegetable body body refers to a part or the whole of individual vegetables such as branches, flowers and flowering plants, as well as greens and fruits.

According to the present invention, in order to maintain or restore freshness of a vegetable body, at least part of the vegetable body is immersed into cold, low temperature water supersaturated with air. In this case, with a vegetable body having a root system, it is preferable to immerse at least the root system. Furthermore, with a vegetable body having a cut, it is preferable to immerse at least the cut.

To dissolve air into water, pressurized air is used. According to the present invention, to effect satisfactory contact between the pressurized air and the water, the pressurized air is brought into contact with the cold, low temperature water through a porous separator wall member formed with pores.

According to the present invention, to dissolve air supersaturation levels for a short period of time, pores having diameters of 0.1–10 microns are used. However, the pores having diameters of about 1 micron, and particularly, comparatively uniform diameters of mean value of 1 micron are preferable because air can be dissolved supersaturation levels for a very short period of time. As a consequence, according to the present invention, any material can be used as the porous separator wall member only if the material is one having a multiplicity of pores, being water-resistant and corrosion-resistant, and having a mechanical strength capable of bearing the pressure of the pressurized air. As the materials satisfying these requirements, there are porous materials such for example as fine mesh porous glass and porous ceramics. Particularly, a material called silas porous glass, i.e. S.P.G. is preferable because the material is highly water-resistant and corrosion-resistant and easily obtainable.

In the apparatus according to the present invention, the tank for immersing the vegetable body includes at least a pressurized air chamber and a chamber for immersing a vegetable or vegetable body. The pressurized air chamber and the chamber for immersing the vegetable or vegetable body communicate with each other through the pores of the porous separator wall member having the pores so that the pressurized air can be dissolved in the water in the chamber for immersing the vegetable or vegetable body. In this case, the porous separator wall member may be formed to provide various shapes such as a plate shape, a box shape or a hollow cylindrical shape.

When the pressurized air chamber is formed to provide a cylindrical shape by use of the porous separator wall member, it is preferable to provide it in the chamber for immersing the vegetable or vegetable body because a contact area between the air and the water becomes large. When part of the chamber for immersing the vegetable body is formed to provide a cylindrical shape by use of the porous separator wall member, it is preferable to provide it in the pressurized air chamber. In any case, to uniformly raise the concentration of dissolving of the supersaturated air in the water, it is preferable to cause the water in the chamber for immersing the vegetable body to circulate suitably.

According to the present invention, the vegetable or vegetable body is immersed into the cold, low temperature water with supersaturated air. Thus more moisture and air are absorbed by the vegetable or vegetable body, so that, in the immersed vegetable body, biochemical reactions are facilitated, a high value of activated energy is accumulated and the water absorbing capacity of the vegetable body is enhanced. As a consequence, according to the present invention, even with a vegetable body that is deteriorated in quality due to withering and the like, the water absorbing capacity is restored as described above, so that the freshness of the vegetable body can be restored to a considerable extent.

In the apparatus according to the present invention, the pressurized air chamber and the chamber for immersing the vegetable or vegetable body communicate with each other through the pores of the porous separator wall member, whereby dissolving of the air into the cold, low temperature water in the chamber for immersing the vegetable body is enhanced. Thus the absorbing capacity of the vegetable body can be restored for a very short period of time. As a consequence, according to the present invention, maintaining and restoring the freshness of the vegetable body can be effected for a very short period of time.

[ADVANTAGES OF THE INVENTION]

As apparent from the above-described arrangement, the embodiment and the experimental data thereof, according to the present invention:

(1) The vegetables and fruits are immersed in the cold water having dissolved therein supersaturated oxygen for a several minutes to several hours by use of the method and the apparatus according to the present invention. As a result, a remarkable activated effect is increased in the vegetables and fruits.

(2) More specifically, the dissolved oxygen contributes to biochemical reactions of the vegetables, with the result that a high value of activated energy is produced and accumulated and the energy enhances the water absorbing capacity of the vegetables.

(3) Due to lowered water temperature and air temperature, respiration and evaporation of the vegetables are controlled,d so that combined effects thereof can be achieved.

(4) The vegetables and fruits, which have been immersed in the cold water according to the present invention, accumulate more moisture and energy, so that the freshness can be maintained for a longer period of time.

(5) Furthermore, the apparatus is highly simplified in construction, the operation thereof is easy, and moreover, there is no need of using additives as seen in the examples of the prior art, so that the vegetables and fruits are highly safe as food products.

DESCRIPTION OF SPECIFIC EMBODIMENTS

Figure 1:
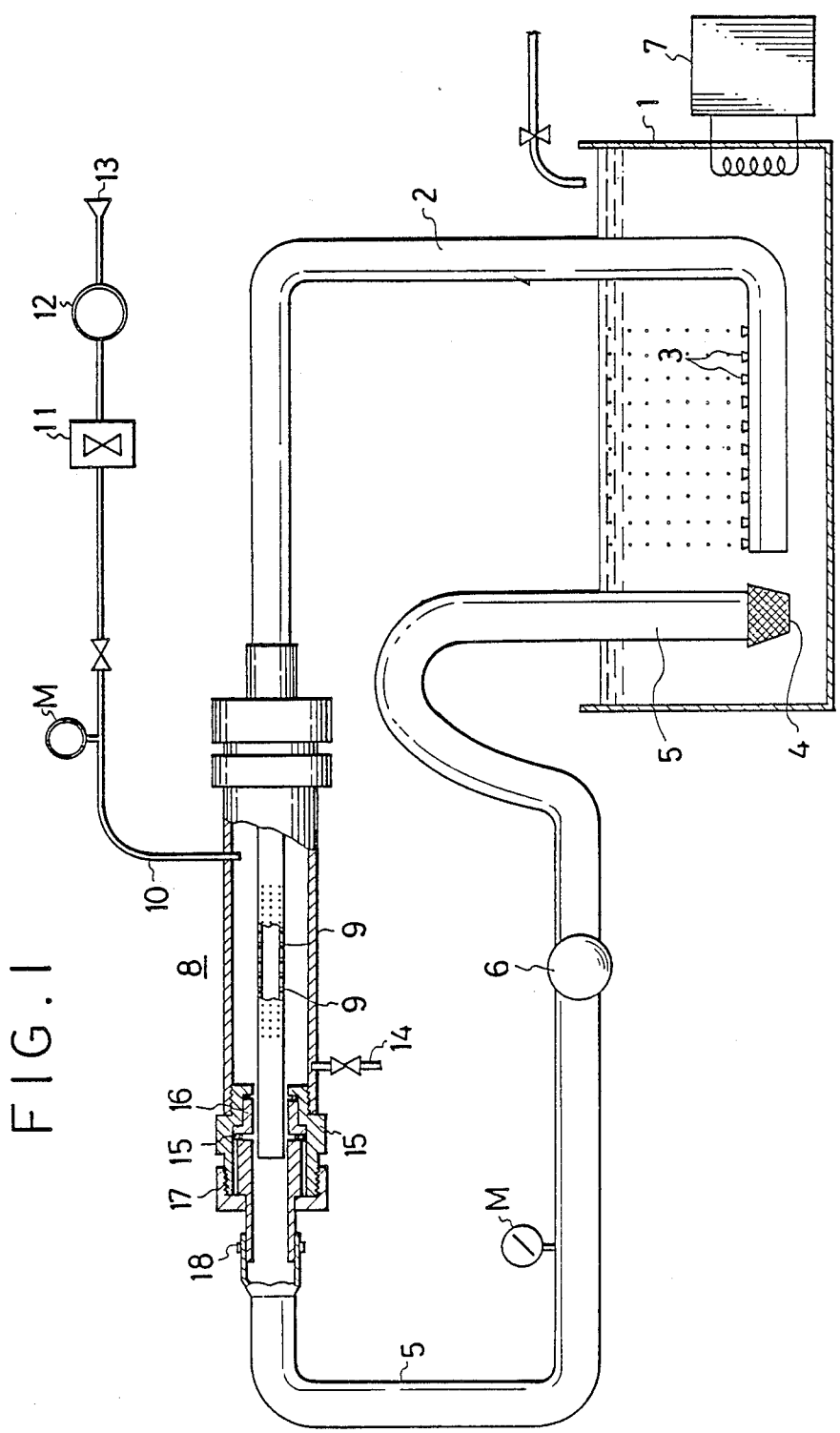
FIG. 1 is a schematic view showing an example of the apparatus according to this invention.

Then, referring to FIG. 1 the example according to this invention is explained fully and more concretely.

First, material for the porous hollow tube 9 is explained which is mounted in the air-absorbing vessel 8 according to this invention. This material was developed by Tadao Nakajima, Takashi Shimizu, and Mikio Kono who are members of Miyazaki Prefecture Industrial Experiments Station. As the main raw material, volcanic ash Shirasu is used which is lain under the ground abundantly all over Minami Kyushu. Volcanic ash Shirasu is mixed with lime and boric acid, calcined, and melted, and quenched to form $CaO - B_2O_3 - SiO_2 - Al_2O_3$ system glass. Then the $CaO - B_2O_3 - SiO_2 - Al_2O_3$ system glass is heat-treated and treated with acid so that porous glass with minute holes whose formation is controlled very precisely is obtained. The method for producing the porous glass, on which patent was applied for in Japan Patent Laid-Open No. 140334/1979) is characterized in that base glass which has calcium oxide($CaO$), boron oxide($B_2O_3$), silicon oxide($SiO_2$), and aluminium oxide($Al_2O_3$) for the main ingredients wherein the base glass contains the components of 8-25% by weight of $CaO$, 8-30% by weight of $B_2O_3$, 45-70% by weight of $SiO_2$, and 5-15% by weight of $Al_2O_3$ is heat-treated at constant temperature between 600° C. and 800° C. and in the period of 2 to 48 hours, and that the heat-treated base glass is dipped in 0.5 to 2 N of hydrochloric acid, nitric acid, or sulfuric acid, during heating between 70° C. and 90° C., so that ingredients which are soluble in these acids are extracted. The porous glass is commonly called S.P.G. glass(- Shirasu Porous Glass).

The porous glass is hard and has heat resistance, and durability. These properties play a very important part in this invention.

And the air-absorbing vessel 8 of this example is made of acrylic resin, and has thickness of 5 mm, an inside diameter of 20mm, and a total length of 200 mm. The porous hollow tube 9 which is mounted in the air-absorbing vessel 8 is made of the S.P.G. glass, and has a thickness of about 1mm, and has innumerables pores with a diameter of about 1 micron which are made with the porosity above 50%, and has an outside diameter of 10 mm, a total length of 200 mm. FIG. 1 illustrates an example in which one porous hollow tube 9 is held with fastening means 16, 17, etc., in the air-absorbing vessel 8, and sealed using sealing means such as O-ring 15 etc.

Dipping vessel 1 is filled with tap water or well water, and placed in a cooling room(not shown). Alternatively blocks of ice can be placed in water in the dipping vessel 1. Or as shown in the drawing, cold water is furnished to the dipping vessel 1 with cooling apparatus 7. If desired the dipping vessel 1, can comprise a cooling vessel (not shown) to provide cold water of 0°-10° C. in the dipping vessel 1.

Then, from the dipping vessel 1 to the air-absorbing vessel 8 which is provided at the different suitable place, pressurized water of fixed pressure is supplied by circulating pump 6, while pressurized air whose pressure is set at the fixed pressure by means of compressor 12 is supplied from the outside or inside of the porous hollow pipe 9 to the air-absorbing vessel 8 so that air bubbles with fine diameter are produced and thereby oxygen is dissolved in the pressurized water.

Then, water in which oxygen is dissolved in the air-absorbing vessel 8 is supplied through supply pipe 2 to the vegetable and fruits dipping vessel 1, and water containing abundant air (oxygen) flows out through jet holes 3, 3, 3 - in water in the dipping vessel 1, under the atmospheric pressure, so that oxygen is supersaturated in the cold water. Accordingly, as previously-mentioned plenty of active energy is accumulated in vegetable and fruits which are dipped in the cold water, by which the sucking ability can be improved, that is, the freshness of vegetable and fruits can be improved remarkably as shown in the experimental results mentioned later.

The cold water in the dipping vessel 1 is returned through strainer 4 and suction pipe 5, and by circulating pump 6 to the air-absorbing vessel 8 in which the cold water comes in touch with the pressurized air again so that the supply of oxygen to the cold water is renewed, and the water containing newly supplied oxygen recirculates through the supply pipe 2 to the dipping vessel 1.

When the cold water pressurized at about 1 $kg/cm^2$ is sent to the air-absorbing vessel 8, in the case of the example illustrated in FIG. 1, air is sent through the suction inlet 13 and compressed by means of compressor 12 and the pressurized air of about 1 $kg/cm^2$ is furnished through air filter 11 and air-pipe 10, from the ouside of the porous hollow pipe 9, to the air-absorbing vessel 8, by which the pressurized cold water containing numerous air-bubbles with the diameter of 1 $\mu$ is sent through the supply pipe 2 to the dipping vessel 1.

Then, the vegetable and fruit dipping vessel 1 in this example has the capacity of 200 ml. To the dipping vessel, air is sent through the compressor at the rate of 15 l/min, so that the cold water and oxygen is furnished to vegetable and fruits. Then the cold water is circulated in the air-absorbing vessel 8 at the rate of 12 l/min.

Figure 2:
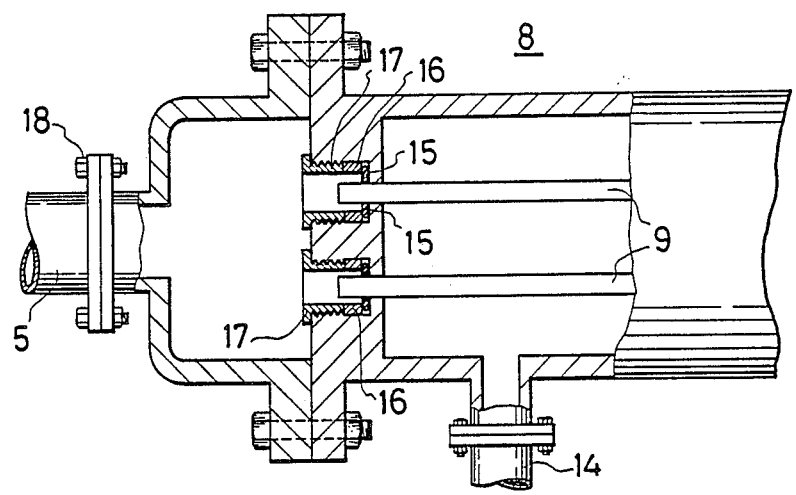
FIG. 2 is an illustration showing an example in which plural hollow tube (S.P.G.) are mounted in the air-absorbing vessel which is the principal part of the apparatus according to this invention.

FIG. 2 illustrates another example in which plural porous hollow pipes 9, 9 (two pipes in the example seen in the drawing) are mounted in the air-absorbing vessel. By mounting more porous hollow tubes in the air-absorbing vessel, it is possible to improve the efficiency.

Figure 3:
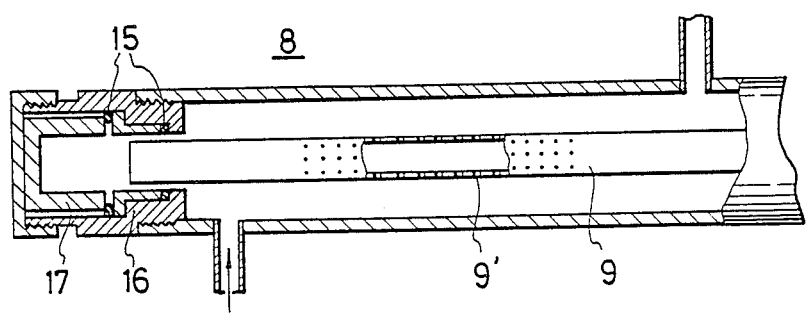
FIG. 3 is an illustration showing an example in which air is furnished through the inside of the porous hollow pipe (S.P.G.).

FIG. 3 illustrates a further example in which air is sent from the inside of the porous hollow tube 9 in the air-absorbing vessel 1. In the same manner as the previously mentioned example, air is sent through the suction inlet 13, and compressed by compressor, and the pressurized air of about 2 $kg/cm^2$ is furnished through the air filter 11 and the air pipe 10 to the air-absorbing vessel 8. Then the pressurized air is furnished in the pressurized cold water (about 1 $kg/cm^2$) in the airabsorbing vessel 8, so that fine air bubbles are produced, by which oxygen gas becomes soluble in the cold water. Accordingly when this situation is maintained for a period between several minutes and several decadal minutes, the cold water containing supersaturated air is obtained. The obtained air containing supersatulated air is sent through the supply pipe 2 and through jet holes 3, 3, 3 to the vegetable and fruits, dipping vessel, in the same manner as the previous example.

THE EXPERIMENTAL RESULTS

The basic conditions were set as follows. The solubility test of air into the cold water which was sent to the dipping vessel was performed, using the S.P.G. pipe.

The dipping vessel 1 with the capacity of 15 l was used. The dipping vessel 1 was filled with cold water of 4° C. The diameter of fine pores of the S.P.G. tube for the air-absorbing vessel 8 was 1.4 μ (the porosity 53%). The pressurized air was supplied at the supply rate of 15 Nl/min, and at the pressure above 2 kg/cm² from the outside of the S.P.G. pipe, to the air absorbing vessel 8.

Cold water was sent through the inside of the S.P.G. tube at the feed rate of 300 l/hr (5 l/min), and at a pressure above 1 kg/cm².

Change of O₂ concentration depending on the above operation condition was as follows.

| Time (min) | O₂ concentration at 1 atm (ppm) | The amount of circulated water (l) | The amount of supplied air (Nl) |
| --- | --- | --- | --- |
| 0 | 8 | 0 | 0 |
| 3 | 13(saturated) | 15 | 45 |
| 5 | 13.8(super-saturated) | 25 | 75 |
| 10 | 14.3(super-saturated) | 50 | 150 |

As previously-mentioned, the concentration of oxygen in the cold water reached the super-saturated condition after about 3 minutes. The concentration of oxygen in the cold water when super-saturated was about twice the oxygen concentration in common cold water (about 7-8 ppm).

Figure 4:
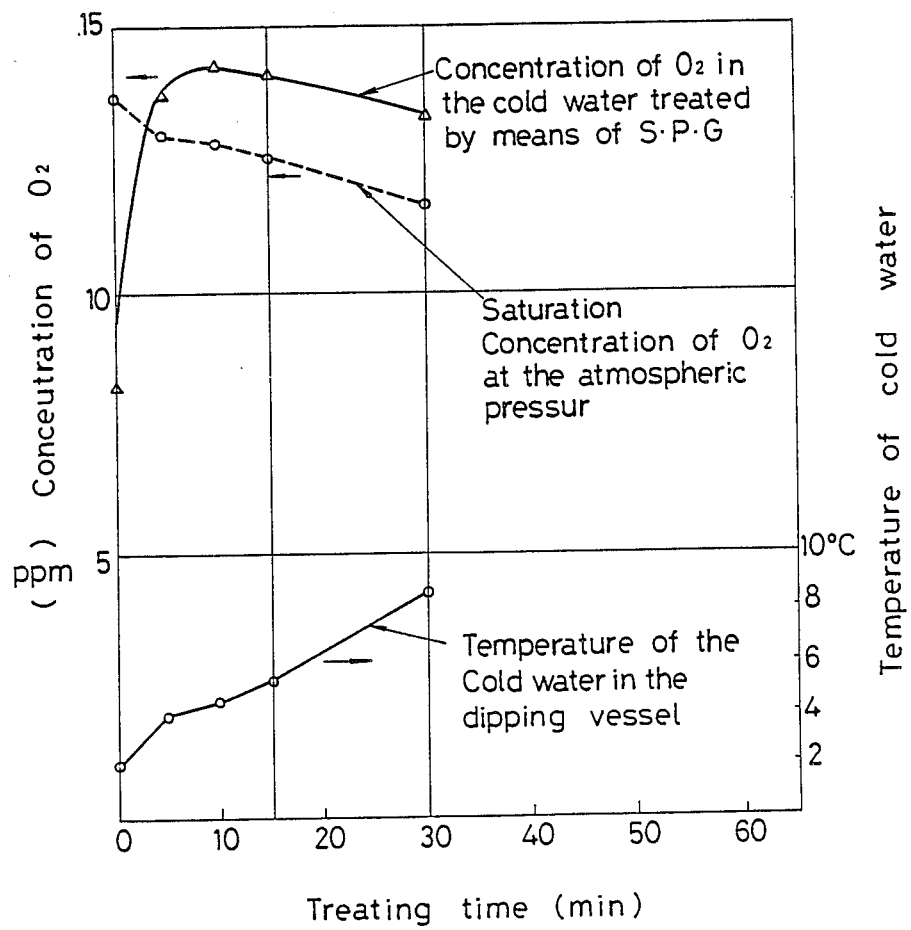
FIG. 4 is a graph showing the results of the experiment in which $O_2$ is absorbed in the cold water treated by means of S.P.G. tube according to this invention.
Figure 5:
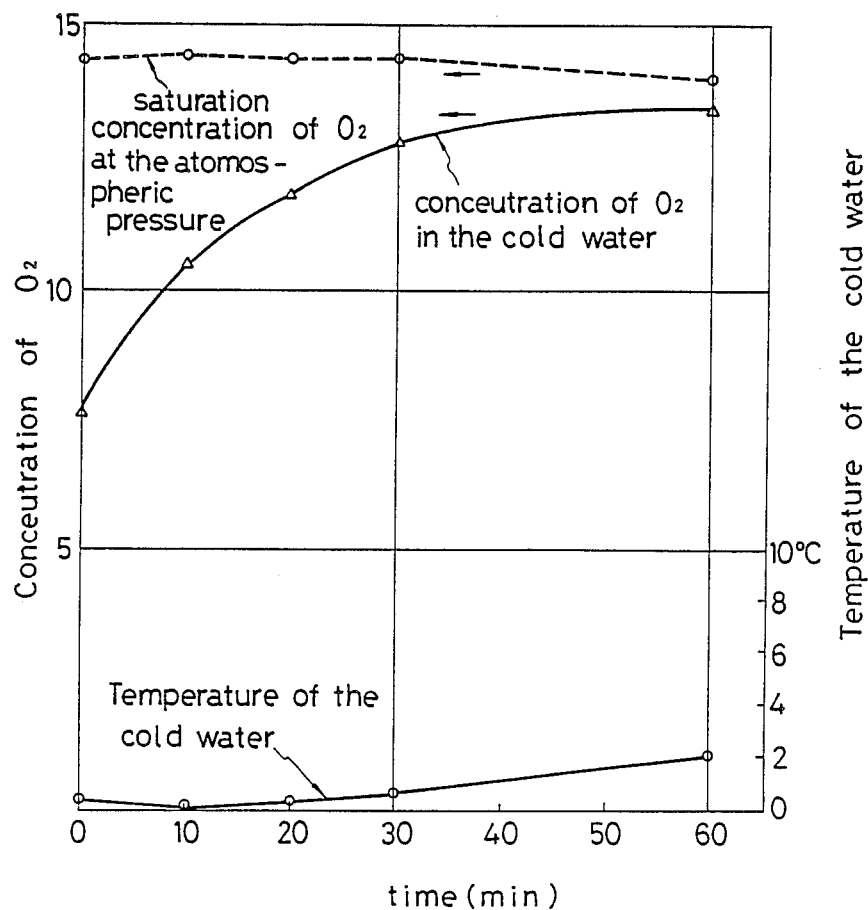
FIG. 5 is a graph showing the results of the experiments in which air is direct-blown without S.P.G. tube.

The data is further experimental were shown in FIGS. 4 and 5.

FIG. 4 shows the result of the experiment which was performed under the test conditions as follows.

TEST CONDITIONS

| Cold water | Tap water containing blocks of ice (a small quantity) 15 l |
| --- | --- |
| The S.P.G. tube | 10φ × 200 l (the diameter of fine pores 1.4μ) |
| The amount of water supplied to the S.P.G. tube | 0.3 m²/H (linear velocity about 1.4 m sec) |
| The pressure of water supplied to the S.P.G tube | 10–12 kg/cm² G |
| The pressure of air supplied to the S.P.G. tube | 2.5 kg/cm² G |
| The amount of air supplied to the S.P.G. tube | 15 Nl/min |
| The temperature of air supplied to the S.P.G tube | 29–30° C. (room temperature) |

FIG. 5 shows the results of the experiment which was performed under the test conditions as follows.

TEST CONDITIONS

| Cold water | Tap water containing blocks of ice (a small quantity) 15 l |
| --- | --- |
| The pressure of blown air | 2.6 kg/cm² G |
| The amount of blown air | 1.5 Nl/min |
| Room temperature | 29–30° C. |

Further examples in which various vegetables were treated using the apparatus of this invention were as follows.

The comparison of water absorption of various vegetables.

TEST CONDITIONS (1) Vegetables lacking freshness (dehydrated about 5% and drooped) were used as the base.

(2) Both vegetables which were dipped in the common cold water, and vegetables which are dipped in the water treated by means of the apparatus of this invention were kept at a temperature of about 1° C., and for four hours in a refrigerating room.

(3) The rate of increase of water of the above (2) to the above (1) was calculated.

| A kind of vegetables | The common cold water | The water treated according to this invention |
| --- | --- | --- |
| Santosai | 2.8% | 25.7% |
| Leek | 3.6 | 46.3 |
| Spinage | 8.4 | 31.0 |
| Chrysanthemum coronarium | 1.2 | 34.9 |
| Celery | 32.3 | 51.0 |
| Leaf lettuce | 5.4 | 54.8 |
| Leaf of radish | 23.0 | 44.3 |

What is claimed is:

1. An apparatus for restoring or maintaining freshness of a vegetable or vegetable body comprising:
    an immersion chamber for said vegetables, said immersion chamber holding a predetermined volume of water at a predetermined temperature;
    means provided in the immersion chamber for cooling the water held in the immersion chamber at a temperature from 0° C. to 10° C.;
    means for providing an entering flow of water into said immersion chamber, the means having a plurality of jet holes for discharging the entering flow of water into the immersion chamber so as to agitate the water held in the immersion chamber;
    means for providing an exit flow of water from said immersion chamber such that the water in the immersion chamber, the entering flow of water into said immersion chamber and the exit flow of from the immersion chamber form a flow system of water for said apparatus;
    pump means disposed in the flow system for circulating the water through the flow system; and
    air supply means for supplying air at a predetermined pressure to supersaturate water in said flow system with air at a predetermined location in said flow system such that the supersaturated air-water mixture is provided in said immersion chamber when said vegetables are immersed therein to permit said vegetables to be supplied with predetermined amounts of oxygen from the water in said immersion chamber, the air supply means including a porous wall member composed of porous glass having pores of diameter of 0.1 to 10 microns, and being arranged such that said air passes through said pores and into said water.

2. The apparatus as claimed in claim 1 wherein said porous wall member is of cylindrical shape.

3. The apparatus as claimed in claim 1 wherein the porous glass is composed of silas porous glass.

4. The apparatus as claimed in claim 1 wherein the diameter of said pores in said porous wall member have a mean value of one micron.

5. The apparatus as claimed in claim 1 wherein said porous member is provided in said flow system outside said immersion chamber and arranged such that air passes through said porous member into said water.

6. The apparatus as claimed in claim 1 wherein said porous member is provided in the immersion chamber and arranged such that the air passes through the porous wall member and into the water held in the immersion chamber.

* * * * *

UNITED STATES PATENT AND TRADEMARK OFFICE
CERTIFICATE OF CORRECTION

PATENT NO. : 4,884,500
DATED : December 5, 1989
INVENTOR(S) : Iwasaki et al.

It is certified that error appears in the above-identified patent and that said Letters Patent is hereby corrected as shown below:

At column 1, line 26, delete "other methods".

At column 2, line 63, delete "having".

At column 3, line 5, change "body body" to --body--.

At column 3, line 23, before "supersaturation" insert --to--.

At column 3, line 28, after "dissolved" insert --to--.

At column 3, line 49, change "in the water" to --into the water--.

At column 4, line 42, change "controlled,d" to --controlled--.

At column 5, line 22, before "Japan" insert --(--.

At column 6, line 26, change "1" to --2--.

At column 6, line 57, change "air" to --water--.

At column 6, line 57, change "supersatulated" to --supersaturated--.

UNITED STATES PATENT AND TRADEMARK OFFICE
CERTIFICATE OF CORRECTION

PATENT NO. : 4,884,500

DATED : December 5, 1989

INVENTOR(S) : Iwasaki et al

It is certified that error appears in the above-identified patent and that said Letters Patent is hereby corrected as shown below:

At column 7, line 29, change "The data is further experimental were" to --The experimental data is further--.

Signed and Sealed this

Fourteenth Day of May, 1991

*Attest:*

HARRY F. MANBECK, JR.

*Attesting Officer*  *Commissioner of Patents and Trademarks*